U. HOUZE.
DEVICE FOR FORMING GLASS CYLINDERS.
APPLICATION FILED FEB. 9, 1914.
1,132,270.
Patented Mar. 16, 1915.
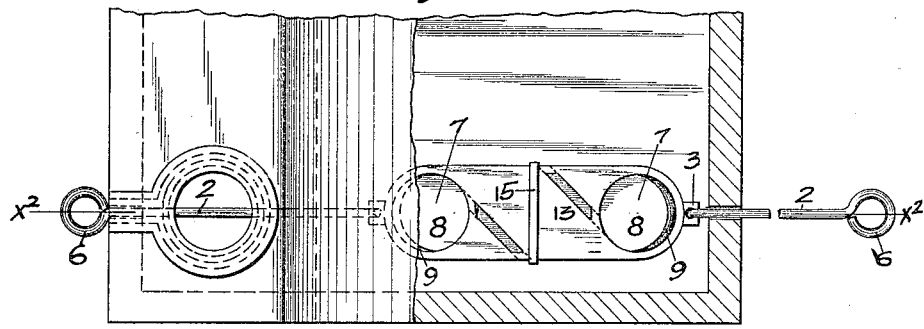
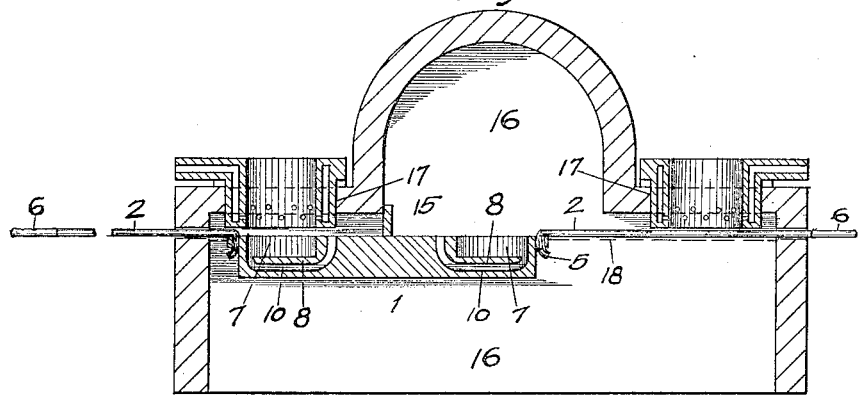
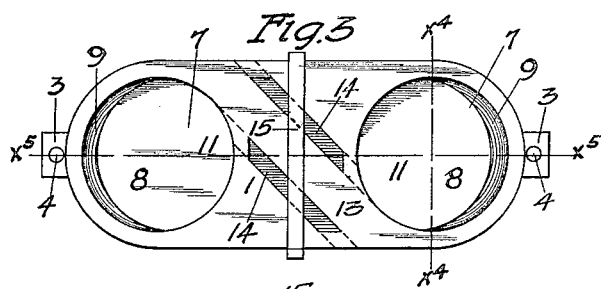
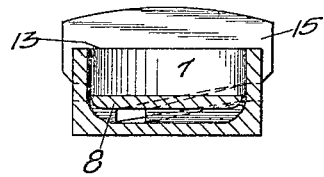
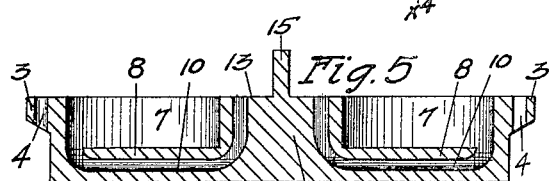
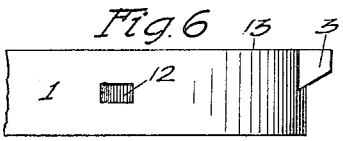
Witnesses:—
Gertrude Geffen
J. W. Chester
Inventor,
ULGISSE HOUZE
By Luther L. Mack
His Attorney.

UNITED STATES PATENT OFFICE.

ULGISSE HOUZE, OF POMONA, CALIFORNIA, ASSIGNOR OF FOUR-FIFTHS TO FERDINAND T. HOUZE AND JOHN H. HOUZE, OF POMONA, CALIFORNIA, NOEL J. HOUZE, OF OSHKOSH, WISCONSIN, AND AUSTIN McFADDEN, OF GRAND RAPIDS, MICHIGAN.

DEVICE FOR FORMING GLASS CYLINDERS.

1,132,270.  Specification of Letters Patent.  Patented Mar. 16, 1915.

Original application filed December 24, 1912, Serial No. 739,569. Divided and this application filed February 9, 1914. Serial No. 819,096.

*To all whom it may concern:*

Be it known that I, ULGISSE HOUZE, a citizen of the United States, residing at Pomona, in the county of Los Angeles and State of California, have invented a new and useful Device for Forming Glass Cylinders, of which the following is a specification.

My invention relates to improvements in floating receptacles as used in glass tank furnaces for drawing cylinders, and the object of my invention is to provide a means of obtaining glass of uniform temperature from the center of the tank and rendering the same accessible for delivery to the blowing tube; another object is to prevent the premature and irregular cooling of the cylinders as they are drawn; another object is to provide an even and uniform thickness of the glass in the cylinders and the elimination of faults, waves and bubbles in the glass.

Other objects may appear in the following description.

I attain this object by means of the mechanism illustrated in the accompanying drawings, in which—

Figure 1 is a fragmentary plan of a glass tank furnace showing my device in position in the tank; Fig. 2 is a sectional elevation of Fig. 1 on the line $x^2$—$x^2$; Fig. 3 is a plan of my floating receptacle; Fig. 4 is a sectional elevation of Fig. 3 on the line $x^4$—$x^4$; Fig. 5 is a sectional elevation on the line $x^5$—$x^5$ of Fig. 3 and Fig. 6 is a fragmentary side elevation of Fig. 3.

Similar reference numerals indicate the same parts throughout the specifications and the several views of the drawings.

Reference is had to a patent granted to me by the United States on Nov. 23, 1909, Serial No. 941,148, for improvements in glass making apparatus and to my application for patent filed Dec. 24, 1912, Serial No. 739,569 for certain other improvements in the art.

It should be understood that my invention as herein disclosed does not relate to glass blowing machines nor is it adapted for use in connection with such machines, but it is an important element that enters into and bears distinctly upon the art of forming window glass, and sheet glass, which in its formation is first blown or drawn from the furnace in cylinders and then made into sheets, and it is for the purpose of eliminating certain faults and facilitating the forming of the cylinders that my device is designed.

A great deal of trouble is encountered in the forming of cylinders of this character by the foreign substances which commonly float upon the surface of the glass in the tank being drawn into the cylinders and by the glass from the top of the molten mass in the tank, which is cooler than that beneath the surface being drawn into the cylinders and the difference of temperature causes faults and streaks in the glass and makes the thickness of the glass irregular. The glass at the sides of the tank is also cooler than that in the center, and the more common types of devices now used obtain the glass for the cylinders either from the surface or the sides of the mass, whereas my device is designed for obtaining always the hottest glass from the central portion of the tank and from beneath the surface, as hereinafter described.

As herein described and claimed, my device consists of the floating receptacle 1 and the rods 2 for drawing them back and forth from one side of the tank to the other, each end of the receptacle 1 being provided with lugs 3 having the holes 4 adapted to receive the ends 5 of the rods 2, the outer ends 6 of these rods being bent to form a hand hole and being slidable in the sides of the tank, as shown.

The receptacles 1 may be made of fire clay or any suitable material and have at each end the pockets 7 which are circular to conform to the shape and size of the cylinders to be drawn, the bottoms 8 of the pockets being provided with the crescent shaped openings 9 adjacent to the ends of the receptacle.

Beneath the bottoms 8 are the shallow chambers 10 which have passages 11 extending diagonally toward the opposite end of the receptacle and upwardly from the pockets to the sides with the openings 12 in the sides communicating with the glass in the tank, the central portion of these passages communicating with the top 13 of the receptacle by means of the vertical passages 14. The top of the receptacle is provided in the center with the vertically projecting lateral rib 15 adapted to engage the sides of the hood to the tank as shown in Fig. 2 when the receptacle is moved over to one side or the other of the tank.

The tank 16 may be of any suitable form or structure such as commonly used, but for convenience I show a hooded tank with the circular openings 17 laterally opposite in the top of the tank on each side of the hood, with my air cooled thimble as described and claimed in my application hereinbefore referred to positioned in the openings.

My receptacle may be of any suitable size to suit the width of the tank in which it is used, and as shown, the receptacle shown in the tank in Fig. 2 being longer than the one shown in Fig. 3, to accommodate the width of the tank.

In Fig. 2 the dotted line 18 represents the normal level of the glass in the tank, and as shown, my receptacle is adapted to float in the glass with its top surface slightly above the level thereof and the major portion of the body submerged therein, the inlets 12 in the sides of the receptacle being a considerable below the surface of the glass, or sufficiently to insure a pure quality of glass being drawn therethrough, and so as to prevent the foreign substances from the surface from being drawn into the passages and thence into the cylinders.

The receptacles are so constructed that when it has been drawn over to one side of the tank by the rod on that end, the pocket in the end of the receptacle nearest the side of the tank to which it is drawn will register with the thimble in the opening 17 and the rib 15 will engage and rest against the side of the hood, and when it is drawn over to the opposite side of the tank the pocket in the other end will register similarly with the thimble on that side and the rib will rest against the opposite side of the hood, the purpose of the rib being to shut off a draft from the center of the tank so that the air will not cause any defects in the cylinders or cause an irregular cooling thereof.

It is obvious that by means of the passages 11 which extend from the pockets inward to the center of the tank, the flow of the glass will be directed from the center of the tank to the pockets, so that the hottest glass will be supplied to the pockets, and from the shallow chambers 10, through the openings 9 and the pockets 8 into the thimbles immediately above the pockets, the cylinders being cooled in the thimbles and drawn off as usual. After a cylinder of glass has been drawn from one side of the tank, the receptacle is drawn over to the opposite side of the tank and a cylinder drawn there through the other pocket, and as a cylinder forming operation requires about twenty minutes, any particles of glass which may have become cooled in one operation may be reheated before another operation and thus eliminate the necessity for removing the receptacle for cleaning purposes.

While I am aware that numerous patents have been granted for improvements in floats I am not aware that a device for the purpose and embracing the economical and valuable features of my invention has ever before been used or known, and I desire to claim broadly thereon.

Having thus described my invention, what I claim as new and desire Letters Patent for is:

1. A float for glass tanks having a pair of pockets formed in opposite ends thereof, on the upper side, and provided with passages terminating in the sides thereof whereby a supply of hot glass from near the center of the tank may be directed to said pockets in a cylinder forming operation.

2. A float for glass tanks having a pair of pockets formed in opposite ends thereof, on the upper side, shallow sub-pockets beneath each of said upper pockets and in communication therewith, and passages for directing a supply of hot glass from near the center of the tank to said lower pockets and thence to said upper pockets, in a cylinder forming operation.

3. A device of the character described having an open pocket in each end of the top thereof, a sub-pocket beneath each of said upper pockets communicating therewith, and passages leading from the sides of said device to said sub-pockets for directing a supply of hot glass from near the center of the tank to said upper pockets in a cylinder forming operation.

4. A floating receptacle for glass tanks capable of being moved laterally in the tank on the surface of the glass, alternately from one side to the other thereof, in successive cylinder forming operations, having a pocket formed in each end and open at the top, sub-pockets formed beneath said upper pockets and communicating therewith, and passages leading from the sides of said receptacle to said sub-pockets for directing a supply of melted glass from near the center of the tank thereto, said passages terminating at a point beneath the surface of the glass in said tank.

5. A floating receptacle for glass tanks capable of being moved laterally in a tank on the surface of the glass, alternately from one side to the other of said tank, in successive cylinder forming operations, having a pocket formed in each end thereof, a sub-pocket beneath each of said pockets and separated therefrom by means of a partition having a crescent shaped opening for affording communication therebetween, and passages leading from a point in each side of said receptacle substantially beneath the surface of the glass in the tank to said sub-pockets, for directing a supply of heated glass from near the center of said tank thereto, in a cylinder forming operation.

6. In a device of the character described, a floating receptacle having pockets formed in each end thereof, a bottom in each of said pockets having a crescent shaped opening, a sub-pocket beneath each of said other pockets and communicating therewith by means of said openings, and a diagonal passage leading from each of said sub-pockets toward the opposite end of said receptacle and terminating in the sides thereof for directing a supply of uniformly heated glass from near the center of a glass tank through said sub-pockets and said openings to said pockets, as described.

7. In a device of the character described, a floating receptacle having pockets formed in each end thereof, a bottom in each of said pockets having a crescent shaped opening, a sub-pocket beneath each of said pockets and communicating therewith by means of said openings, a diagonal passage leading from each of said sub-pockets toward the opposite end of said receptacle and terminating in the sides thereof for directing a supply of uniformly heated glass from near the center of a glass tank through said sub-pockets and said openings to said pockets, and a vertical outlet to each of said passages terminating in the top of said receptacle, as described.

8. In a device of the character described, a floating receptacle having pockets formed in each end thereof, a bottom in each of said pockets having a crescent shaped opening, a sub-pocket beneath each of said pockets and communicating therewith by means of said openings, a diagonal passage leading from each of said sub-pockets toward the opposite end of said receptacle and terminating in the sides thereof for directing a supply of uniformly heated glass from near the center of a glass furnace through said sub-pockets and said openings to said pockets, a vertical outlet to each of said passages terminating in the top of said receptacle, and a lateral rib projecting upwardly from the top of said receptacle, as described.

9. In a device of the character described, a floating receptacle having pockets formed in each end thereof, a bottom in each of said pockets having a crescent shaped opening, a sub-pocket beneath each of said pockets and communicating therewith by means of said openings, a diagonal passage leading from each of said sub-pockets toward the opposite end of said receptacle and terminating in the sides thereof for directing a supply of uniformly heated glass from near the center of a glass tank through said sub-pockets and said openings to said pockets, a vertical outlet to each of said passages terminating in the top of said receptacle, a lateral rib projecting from the top of said receptacle, and lugs on each end thereof, as described.

ULGISSE HOUZE.

Witnesses:
H. T. BELCHER,
W. N. BEACH.

Copies of this patent may be obtained for five cents each, by addressing the "Commissioner of Patents, Washington, D. C."